US009720537B2

(12) United States Patent
George et al.

(10) Patent No.: US 9,720,537 B2
(45) Date of Patent: *Aug. 1, 2017

(54) SCALING PRESSURE DATA FROM A PRESSURE-SENSITIVE DEVICE (71) Applicant: Adobe Systems Incorporated, San Jose, CA (US)

(72) Inventors: Paul George, Hillsborough, CA (US); Brian Jeffrey Brantner, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,799

(22) Filed: Jan. 14, 2016

(65) Prior Publication Data

US 2016/0132168 A1    May 12, 2016

Related U.S. Application Data (63) Continuation of application No. 13/408,612, filed on Feb. 29, 2012, now Pat. No. 9,250,720.

(51) Int. Cl.
*G06F 3/041* (2006.01)
*G06F 3/0354* (2013.01)

(52) U.S. Cl.
CPC ........ *G06F 3/0414* (2013.01); *G06F 3/03545* (2013.01); *G06F 2203/04105* (2013.01)

(58) Field of Classification Search
None
See application file for complete search history.

(56) References Cited

U.S. PATENT DOCUMENTS

| 5,635,683 | A | * | 6/1997 | McDermott | .......... G06F 3/0414 |
| | | | | | 178/19.04 |
| 7,696,980 | B1 | | 4/2010 | Piot et al. | |
| 9,250,720 | B2 | * | 2/2016 | George | ............... G06F 3/03545 |
| 2008/0180410 | A1 | | 7/2008 | McCall et al. | |
| 2009/0135140 | A1 | | 5/2009 | Constantin et al. | |
| 2011/0304643 | A1 | | 12/2011 | Marison | |
| 2012/0274591 | A1 | | 11/2012 | Rimas-Ribikauskas et al. | |
| 2013/0009884 | A1 | | 1/2013 | Wang et al. | |
| 2013/0120426 | A1 | | 5/2013 | DiVerdi et al. | |
| 2013/0221993 | A1 | | 8/2013 | Ksondzyk et al. | |
| 2014/0145994 | A1 | | 5/2014 | Burrough et al. | |

OTHER PUBLICATIONS

Graham Alasdair Wilson, Using Pressure Input and Thermal Feedback to Broaden Haptic Interaction with Mobile Devices, School of Computing Science, University of Glasgow Jun. 2013, 273 pages.*

(Continued)

*Primary Examiner* — Tung Lau (74) *Attorney, Agent, or Firm* — Keller Jolley Preece (57) ABSTRACT

A method and apparatus for filtering pressure data from a pressure-sensitive device is disclosed. A computer implemented method for filtering pressure data from a pressure-sensitive device comprises receiving, from a pressure sensitive device, a raw pressure value for a stroke, filtering the raw pressure value for the stroke to determine a filtered pressure value, and computing a width of a stroke based on the filtered pressure value.

20 Claims, 5 Drawing Sheets

(56) References Cited

OTHER PUBLICATIONS

Sungjae Hwang in Estimate pressure input using vibration absorption on mobile devices (Aug. 28, 2013, Munich, Germany, pp. 31-34 ).*
"Wacom Pen Input Complements Adobe Photoshop CS5 Brush Engine and Revs Up Creative Productivity," downloaded on Jun. 18, 2012 from website: http://www.wacom.com/en/Company/News/Wacom%20Pen%20Input%20Complements %20Adobe %20Photoshop%20CS5%20Brush%20Engine%20And%20Revs %20Up%20Creative%20Productivity.aspx, 2 pages.
Sundae Hwang in Estimate pressure input using vibration absorption on mobile devices, Aug. 27-30, 2013, Munich, Germany, Copyright 2013 ACM 978-1-4503-2273-7/13/08.
U.S. Appl. No. 13/408,612, Aug. 18, 2014, Office Action.
U.S. Appl. No. 13/408,612, Mar. 3, 2015, Office Action.
U.S. Appl. No. 13/408,612, Sep. 23, 2015, Notice of Allowance.

* cited by examiner

SCALING PRESSURE DATA FROM A PRESSURE-SENSITIVE DEVICE

CROSS REFERENCE TO RELATED APPLICATIONS

The present application is a continuation of U.S. application Ser. No. 13/408,612 filed Feb. 29, 2012. The aforementioned application is hereby incorporated by reference in its entirety.

BACKGROUND OF THE INVENTION

Field of the Invention

Embodiments of the present invention generally relate to pressure-sensitive digital input systems and, more particularly, to a method and apparatus for filtering pressure data from a pressure-sensitive device.

Description of the Related Art

Touchscreen devices allow users to navigate their computer devices with a touch of a finger or stylus on the touchscreen. The device reads input made by the contact of the finger or stylus and the screen. These devices have evolved to read strokes made by the finger or stylus on the screen and mimic these strokes graphically on the screen. Drawing tablets are computer input devices that allow users to hand-draw images and graphics on the tablet similar to how one would draw with a pencil on paper. Typically, a user draws with a stylus on the drawing tablet. The tablet is like a digital canvas where the motion of the stylus is reproduced digitally on a computer display. Architects often use tablets for architectural drafting, while artists commonly use tablets for artistic renderings. As such, precision and accuracy are important.

However, the raw pressure data from the stylus on a tablet device can be overly-sensitive or not sensitive enough for use in drawing variable-width vector strokes in applications such as ADOBE® Ideas (available from Adobe Systems, Inc. of San Jose, Calif.). This causes an abrupt change in the width of the strokes far more rapidly than a user may desire. Further, if the user selects a larger brush stroke width, the problem is more pronounced. If the user decreases pressure on the stylus, the stylus sometimes interprets this incorrectly as if the user has lifted the stylus from the tablet. As a result the system causes the stroke to end before the user actually intends for it to do so.

Therefore, there is a need for a method and apparatus for filtering pressure data from a pressure-sensitive device.

SUMMARY OF THE INVENTION

Embodiments of the present invention generally relate to a method and apparatus for filtering pressure data from a pressure-sensitive device. In an embodiment, a computer implemented method for filtering pressure data from a pressure-sensitive device comprises receiving a raw pressure value for a stroke from a pressure sensitive device. The raw pressure value for the stroke is filtered to determine a filtered pressure value and a width of the stroke is computed based on the filtered pressure value.

While the method and apparatus is described herein by way of example for several embodiments and illustrative drawings, those skilled in the art will recognize that the method and apparatus for filtering pressure data from a pressure-sensitive device are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for filtering pressure data from a pressure-sensitive device as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for filtering pressure data from a pressure-sensitive device. Raw pressure data is received from a pressure-sensitive device. A filtering module uses a filter pressure algorithm to filter the raw pressure data. A remapping module applies a false lift avoidance algorithm to remap the raw pressure data to allow users to achieve lower pressure values without accidentally triggering "false lift" events. The remapping module then takes the remapped value from the false lift avoidance algorithm and applies a minimum pressure algorithm to ensure it does not fall below a minimum accepted value. A filtering module uses a filter pressure algorithm to filter the remapped pressure value. An input module then adjusts the stroke width to the filtered remapped pressure value. The filtered remapped pressure value is used by a drawing application on the tablet, such as ADOBE® Ideas, to render the stroke on a display based on the adjusted stroke width.

Various embodiments of an apparatus and method for filtering pressure data from a pressure-sensitive device are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and apparatus for filtering pressure data from a pressure-sensitive device. Advantageously, a filtering algorithm allows a drawing application, such as ADOBE® Ideas to render strokes based on filtered pressure data in a way that looks and feels much more pleasing and natural to a user than strokes based on the raw pressure data might.

Figure 1:
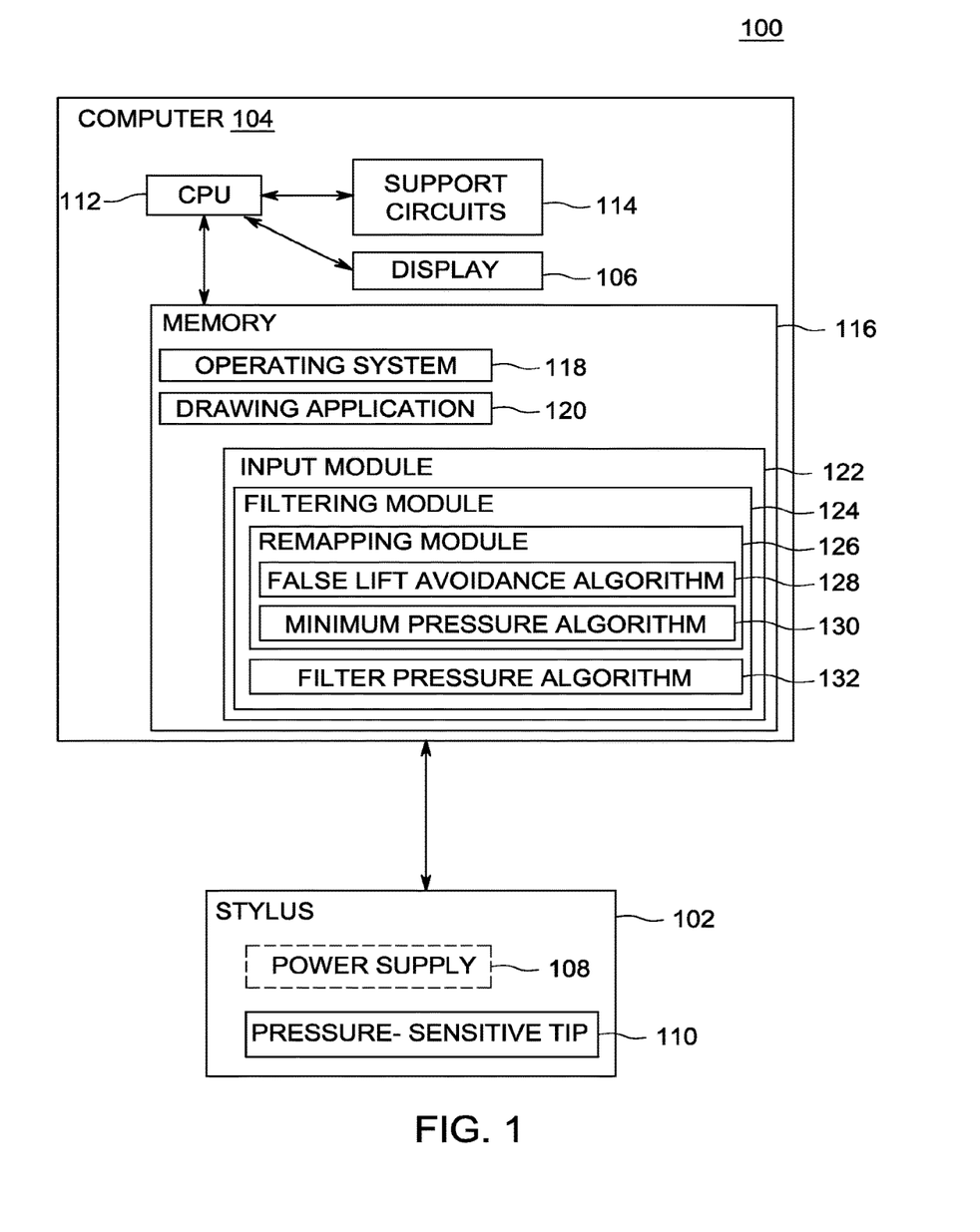
FIG. 1 depicts a system for filtering pressure data from a pressure-sensitive device, according to one or more embodiments of the invention.

FIG. 1 depicts a system for filtering pressure data from a pressure-sensitive device. The system 100 comprises a stylus 102 and a computer 104.

The computer 104 comprises a CPU 112, supports circuit 114, a display 106, and a memory 116. The computer 104 is a type of computing device capable of receiving pressure-sensitive input from a stylus or from a pressure-sensitive touch screen (e.g., a laptop, a desktop, a Personal Digital Assistant (FDA), a mobile phone and/or the like) known to one of ordinary skill in the art. The CPU 112 may comprise one or more commercially available microprocessors or microcontrollers that facilitate data processing and storage. The various support circuits 114 facilitate the operation of the CPU 112 and include one or more clock circuits, power supplies, cache, input/output circuits, displays, and the like. The memory 116 comprises at least one of Read Only Memory (ROM), Random Access Memory (RAM), disk drive storage, optical storage, removable storage and/or the like. The memory 116 comprises an operating system 118, a drawing application 120, and an input module 122. The input module 122 comprises a filtering module 124. The filtering module 124 comprises a remapping module 126 and a filter pressure algorithm 132. The remapping module comprises a false lift avoidance algorithm 128 and a minimum pressure algorithm 130. The operating system (OS) 118 may comprise various commercially known operating systems.

According to some embodiments, the stylus 102 comprises a pressure sensitive tip 110 and an optional power supply 108. The stylus 102 receives raw pressure data from the pressure-sensitive tip 110 and sends the raw pressure data to the input module 122 of the computer 104.

In another embodiment, the input module 122 receives the raw pressure data from a pressure-sensitive touchscreen on the computer 104. With a touchscreen, the input may come from a finger or a passive device, such as a stylus. As such, the raw pressure data comes from the screen at the point where the finger and the screen or the stylus and the screen make contact. In another embodiment, the input module 122 receives the raw pressure data from the motion of a stylus on a drawing tablet computer wherein either the stylus tip or the drawing tablet surface may be pressure-sensitive. When using a drawing tablet, the raw pressure data is measured from the contact between the stylus and the drawing tablet. The raw pressure data is a stream of numbers representing the pressure; the stream of numbers varying between two values representing a minimum and a maximum value. In some embodiments, the raw pressure data is a stream of numbers between 0 and 1, where 0 represents no pressure and 1 represents maximum pressure.

The filtering module 124 comprises a remapping module 126 which maps the raw pressure value by applying a false lift avoidance algorithm 128 to avert "false lift" events and then by applying a minimum pressure algorithm 130 to ensure the pressure value is above a minimum acceptable value, as explained in FIG. 3 below. The filtering module 124 then applies a filter pressure algorithm 132 to filter the mapped pressure data. The filtering module 124 utilizes the filter pressure algorithm 132, as explained in FIG. 4 below, to calculate a filtered mapped pressure value. The filter pressure algorithm 132 determines a filtered pressure value by weighting a previous filtered value and adjusting the current mapped value to be closer to the previous filtered value so the change in the stroke is more gradual. The input module 122 then adjusts a stroke width based on the filtered pressure value.

The drawing application 120 then renders the stroke on the display 106. Examples of the drawing application 120 may include ADOBE® Ideas and ADOBE® Illustrator among others.

Figure 3:
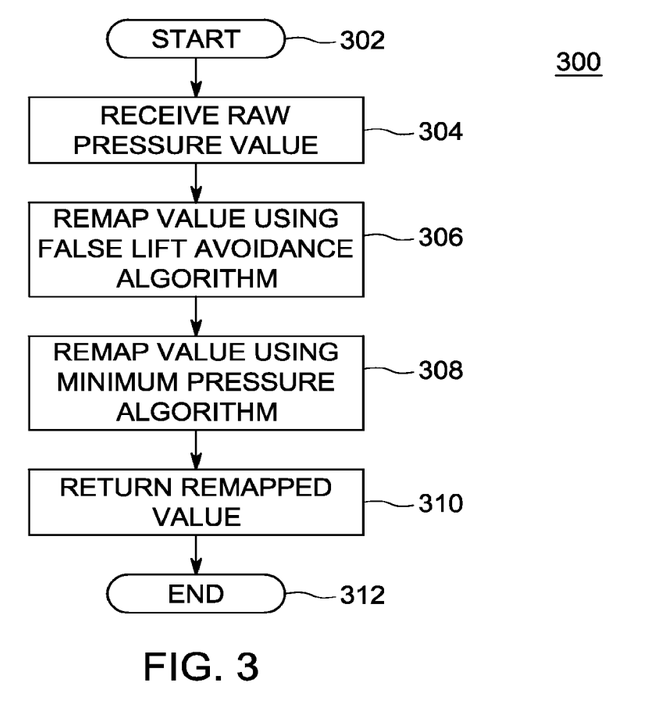
FIG. 3 depicts a flow diagram of a method for remapping raw pressure data as performed by the remapping module of FIG. 1, according to one or more embodiments of the invention.

According to some embodiments, the filtering module 124 remaps the raw pressure data to allow users to achieve lower pressure values without accidentally triggering false "end stroke" events, as illustrated in FIG. 3. The false lift avoidance algorithm 128 uses a value of 0.4 because pressure values below 0.4 typically result in the reporting of a substantial number of "false lifts", meaning the stylus 102 reports the user has lifted the stylus 102 from the tablet surface, when in fact the user has not. The remapping module 126 of the filtering module 124 takes any raw pressure value 0.4 or below and maps it to 0. All other raw pressure values between 0.4 and 1, the maximum pressure value, are linearly remapped between 0 and 1.

In some embodiments an "adjusted bottom pressure" feature is optionally turned on to ensure the remapped pressure value is not below an acceptable minimum value.

Figure 2:
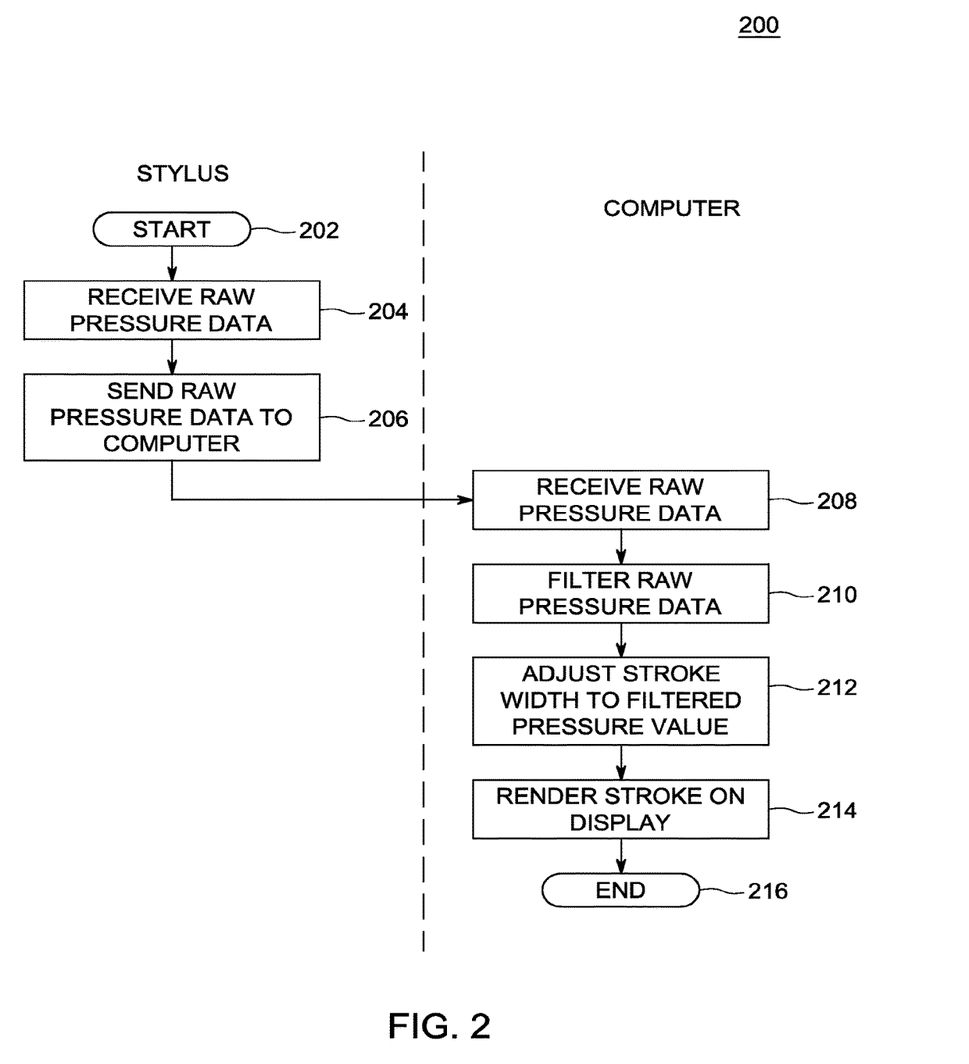
FIG. 2 depicts a flow diagram of a method for processing raw pressure data, as performed by the input module of FIG. 1, according to one or more embodiments of the invention.

FIG. 2 depicts a flow diagram of a method for processing raw pressure data, as performed by the input module 122 of FIG. 1, according to one or more embodiments of the invention. The method 200 processes the raw pressure data received from a stylus by filtering the raw pressure data based on a previous filtered pressure data value, adjusting the stroke width according to a filtered pressure value, and then rendering the stroke on a display, according to an embodiment of the invention. The method 200 starts at step 202, and proceeds to step 204.

At step 204, raw pressure data is received. In some embodiments, a stylus receives raw pressure data from a pressure-sensitive tip. The method 200 proceeds to step 206. At step 206, the raw pressure data is sent from the stylus to the computer. The method proceeds to step 208. At step 208, the computer receives the raw pressure data. The data received is a stream of numbers between 0 and 1, which represent the amount of pressure applied to the pressure-sensitive tip. A value of 0 represents no pressure, i.e., the stylus has been lifted from the surface of the tablet. As the pressure values rise above 0, the stroke width increases. The pressure values may increase up to a value of 1, which represents maximum pressure at the stroke width selected by the user. The method 200 proceeds to step 210.

At step 210, the raw pressure data is remapped and then filtered. The raw pressure is remapped so that a value greater than the raw pressure minimum is mapped down to an "adjusted bottom pressure" and all values in between are linearly stretched between the "adjusted bottom pressure" and maximum raw pressure value. This allows users to produce lower pressure values without decreasing the actual pressure to the point where "false lift" events are triggered, and keeps the stroke from becoming too thin, as explained in more detail in FIG. 4. The remapped pressure value is then compared to an immediately previous pressure value. To achieve a smooth vector stroke on the display, the values should be close to one another. A larger difference between the numbers results in a bumpy appearance as illustrated in FIG. 5. The filter acts to adjust the remapped pressure value to be closer to the immediately previous value so when the filtered pressure value is applied to the stroke width and rendered on the display, it results in a smooth stroke. The method 200 proceeds to step 212.

At step 212, a stroke width is adjusted to the filtered pressure value. The method 200 proceeds to step 214. At step 214, the stroke is rendered on the display at the adjusted stroke width. The method 200 proceeds to step 216 and ends.

FIG. 3 depicts a flow diagram of a method for remapping the raw pressure data, as performed by the remapping module of FIG. 1, according to one or more embodiments of the invention. The method 300 starts at step 302, and proceeds to step 304.

At step 304, a raw pressure value is received. As the user attempts to use lower pressure to create a thinner stroke they increase the risk of accidentally triggering an end-stroke or false-lift. To allow the user to create a thinner stroke while protecting against false lifts, a pressure value above a minimum is used to remap the raw pressure value. At step 306, the method 300 remaps the raw pressure value so that a value greater than the raw pressure minimum is mapped down to the minimum raw pressure value and all values in between are linearly stretched between the minimum and maximum raw pressure values. The remapping is calculated using:

$$remap1 = \text{Math.max}(rawPressure - raisedMinimum, 0)/(1 - raisedMinimum)$$

where: remap1 is a remapped pressure value,
rawPressure is the raw pressure value received by the input module,
raisedMinimum is a pressure value above the minimum pressure (0) used for remapping, and
Math.max( ) is a method that returns the higher value between (rawPressure−raisedMinimum) and 0.

In some embodiments, the raisedMinimum is set to 0.4. The method 300 proceeds to step 308. In order to prevent the remapped pressure value from producing too thin of a stroke, the remapped value is again remapped to be between an "adjusted bottom pressure" and the maximum pressure value of 1. The remapping is calculated using:

$$remap2 = adjustedPressureBottom + (1 - adjustedPressureBottom) * remap1$$

where: remap2 is a second remapped pressure value,
adjustedPressureBottom is a constant value above a minimum pressure of 0 to keep the stoke from becoming too thin,
remap1 is the remapped value from step 306 above.

In some embodiments, the adjustedPressureBottom is set to 0.02. The method 300 proceeds to step 310. At step 310, the remapped raw pressure value is returned. The method 300 proceeds to step 312 and ends.

Figure 4:
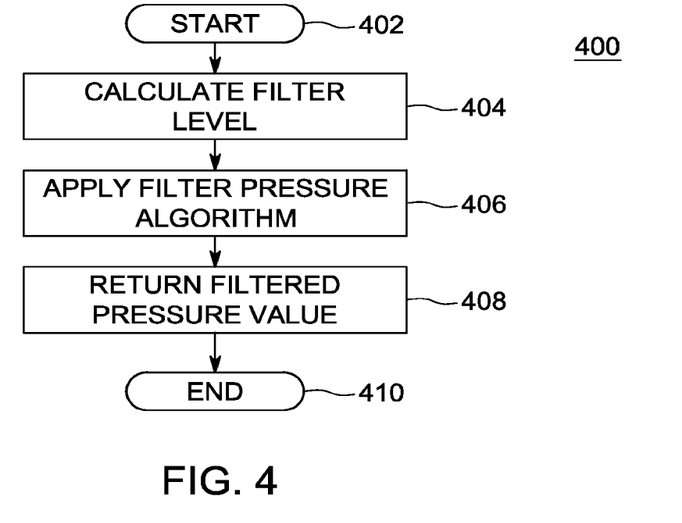
FIG. 4 depicts a flow diagram of a method for filtering the remapped pressure value, as performed by the filtering module of FIG. 1, according to one or more embodiments of the invention.
Figure 5:
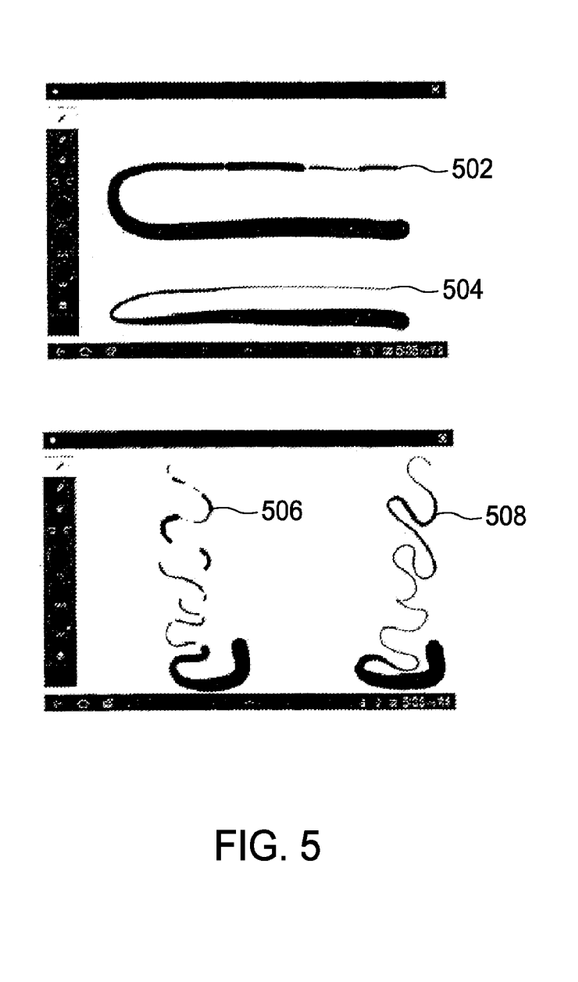
FIG. 5 depicts the effect of remapping raw pressure data as performed by the method of FIG. 4, according to one or more embodiments of the invention.

FIG. 4 depicts a flow diagram of a method for filtering the remapped pressure value, as performed by the filtering module 124 of FIG. 1, according to one or more embodiments of the invention.

The method 400 starts at step 402, and proceeds to step 404. At step 404, a filter level is calculated. The filter level k, is a value between 0 and 1. The closer k is to 1 the quicker the response to a change in pressure. The closer k is to 0 the slower the response. k varies proportionally to the current user-selected maximum stroke width. k is calculated as given below:

$$k = \text{Math.min}(\text{Math.max}((o-c)*m, k\text{Min}), k\text{Max})$$

where: k is the filter level
o is a maximum stroke width constant for filter calculation,
c is a current user-selected maximum stroke width,
kMin is a minimum allowed value for k,
kMax is a maximum allowed value for k,
Math.max is a method that returns the higher value between (o−c)*m and kMin,
Math.min is a method that returns the lower value between Math.max((o−c)*m, kMin) and kMax.

In some embodiments the maximum stroke width constant is set to 61.25, kMin is set to 0.01, and kMax is set to 0.99. The method 400 proceeds to step 406. At step 406, a filter pressure algorithm is applied to the raw pressure data. The pressure filter algorithm determines the filtered pressure value by weighting an immediately previous filtered value and adjusting the current raw pressure value to be closer to the previous filtered value so the change in the stroke is more gradual i.e., the pressure data is low pass filtered. The algorithm is as follows:

$$r(n) = k*p(n) + (1-k)*r(n-1)$$

where: r(n) is the filtered pressure value to actually use to adjust the stroke width, r(n−1) is the previous filtered pressure value, p(n) is the remapped pressure value received from the remapping module, k is the filter level calculated above.

The method 400 proceeds to step 410 and ends.

FIG. 5 depicts the effect of remapping raw pressure data as performed by the method 300 of FIG. 3, according to one or more embodiments of the invention. As depicted in FIG. 5, there is an abrupt break in the strokes 502, 506 as the stylus reports "false lifts". In other words, while trying to draw thinner lines by using lower pressure, the user has inadvertently caused the computer to think that the user has lifted the stylus off the tablet when, in fact, the user has not. In contrast, there is continuity in the strokes 504, 508, when the remapping is on. The remapping feature is turned on to allow the user to produce thinner lines (but not too thing) while using higher pressure.

Figure 6:
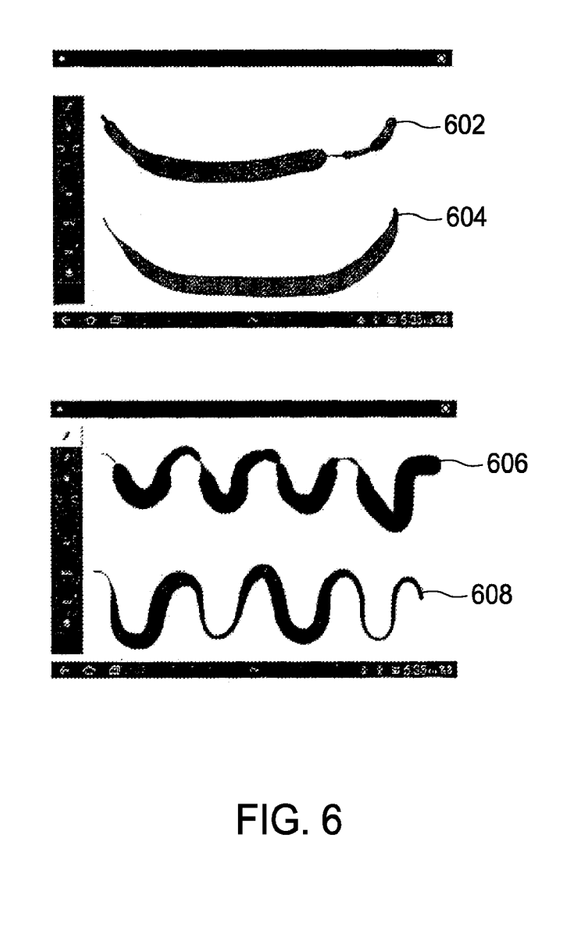
FIG. 6 depicts the effect of the application of the filter pressure algorithm of FIG. 1 on the stroke, according to one or more embodiments of the invention.

FIG. 6 depicts the effect of the pressure filter algorithm of FIG. 1 on the strokes, according to one or more embodiments of the invention. As illustrated in FIG. 6, strokes 602, 606 are drawn by the user without using the filter pressure algorithm. The strokes 602, 606 are uneven, with unnatural thin and thick areas in the stroke. Using the filtering algorithm allows the drawing application to render strokes (such as 604, 608) in a way that looks more pleasing and natural to a user than the strokes rendered using the raw data.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 7:
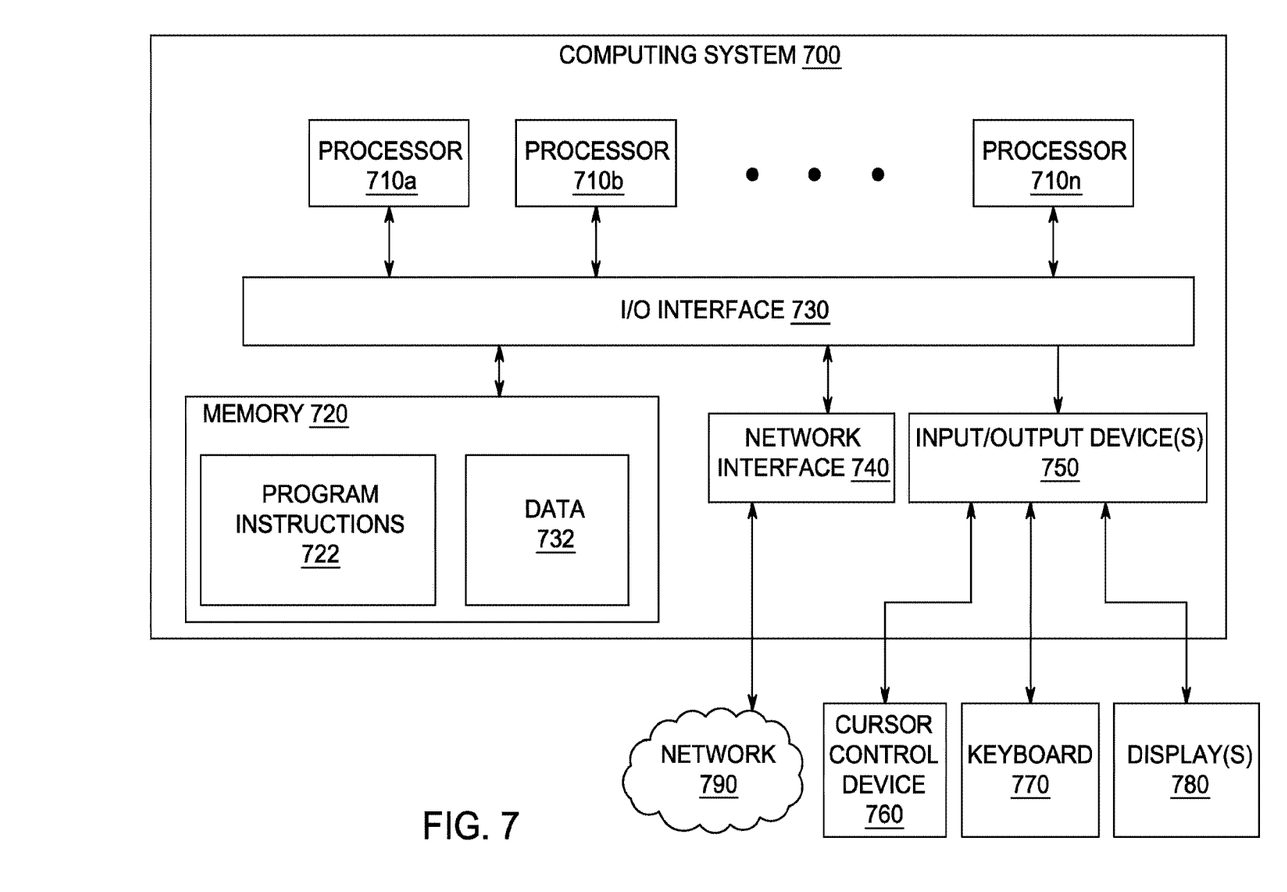
FIG. 7 depicts a computer system that can be used to implement the methods of FIGS. 2, 3 and 4, according to one or more embodiments of the invention.

FIG. 7 depicts a computer system that can be utilized in various embodiments of the present invention to implement the computer and/or the display, according to one or more embodiments.

Various embodiments of method and apparatus for filtering pressure data from a pressure-sensitive device, as described herein, may be executed on one or more computer systems, which may interact with various other devices. One such computer system is computer system 700 illustrated by FIG. 7, which may in various embodiments implement any of the elements or functionality illustrated in FIGS. 1-4. In various embodiments, computer system 700 may be configured to implement methods described above. The computer system 700 may be used to implement any other system, device, element, functionality or method of the above-described embodiments. In the illustrated embodiments, computer system 700 may be configured to implement methods 200, 300 and 400, as processor-executable executable program instructions 722 (e.g., program instructions executable by processor(s) 710) in various embodiments.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In various embodiments, any of components may be utilized by the system to receive user input described above. In various embodiments, a user interface (e.g., user interface) may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x96, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750, In some embodiments, I/O interface 730 may perform any necessary protocol, timing or other data transformations to convert data signals from one components (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the methods described above, such as the methods illustrated by the flowcharts of FIGS. 2-4. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

We claim:

1. A computer-implemented method for generating digital strokes based on pressure data from pressure-sensitive devices, the method comprising:
   receiving, from a pressure-sensitive device, pressure values in response to user interaction relative to the pressure-sensitive device;
   determining, by at least one processor of the pressure-sensitive device, one or more pressure values that fall below a pressure minimum threshold indicative of a lift event;
   identifying, by the at least one processor, an adjusted bottom pressure value, the adjusted bottom pressure indicative of a minimum stroke width;
   scaling, by the at least one processor, pressure values that do not fall below the pressure minimum threshold to obtain remapped pressure values over a range between the adjusted bottom pressure value and a maximum pressure value;
   computing, by the at least one processor, a width of a stroke based on the scaled pressure values; and
   rendering, by the pressure-sensitive device a stroke based on the computed width.

2. The method of claim 1, further comprising filtering the pressure values to smooth the stroke width.

3. The method of claim 1, wherein scaling the pressure values further comprises: subtracting the pressure minimum threshold from a pressure value and dividing by a difference between the maximum pressure value and the pressure minimum threshold to obtain at least one initial remapped pressure value.

4. The method of claim 1, further comprising setting the one or more pressure values below the pressure minimum threshold to a constant pressure value.

5. The method of claim 1, further comprising:
   identifying one or more pressure values that result in one or more false lift events; and
   selecting the pressure minimum threshold based on the one or more pressure values that result in the one or more false lift events.

6. The method of claim 2, wherein filtering the pressure values comprises weighting an immediately previous filtered value and adjusting a current pressure value to be closer to the previous filtered value so a change in the stroke width is more gradual.

7. The method of claim 2, wherein filtering the pressure values comprises using a filter pressure heuristic in which: $r(n)=k*p(n)+(1-k)*r(n-1)$, wherein $r(n)$ is a filtered pressure value, $r(n-1)$ is a corresponding previous filtered pressure value, $p(n)$ is a corresponding remapped pressure value, and $k$ is a filter level based on a selected stroke width.

8. The method of claim 3, wherein scaling the pressure values further comprises: linearly scaling the at least one initial remapped pressure value by multiplying the at least one initial remapped pressure value by the adjusted bottom pressure value+(the maximum pressure value−the adjusted bottom pressure value).

9. An apparatus for generating digital strokes comprising:
   a pressure-sensitive touch screen that outputs pressure values in response to user interaction relative to the pressure-sensitive touch screen;
   at least one processor operatively associated with the pressure-sensitive touch screen; and
   at least one non-transitory computer readable storage medium storing instructions thereon that, when executed by the at least one processor, cause the apparatus to:
   receive pressure values in response to user interaction relative to the pressure-sensitive touch screen;
   determine one or more pressure values that fall below a pressure minimum threshold indicative of a lift event;
   identify an adjusted bottom pressure value, the adjusted bottom pressure indicative of a minimum stroke width;
   scale pressure values that do not fall below the pressure minimum threshold to obtain remapped pressure values over a range between the adjusted bottom pressure value and a maximum pressure value;
   compute a width of a stroke based on the scaled pressure values; and
   render a stroke based on the computed width on the pressure-sensitive touch screen.

10. The apparatus of claim 9, wherein the apparatus comprises a tablet computer.

11. The apparatus of claim 9, further comprising instructions that, when executed by the at least one processor, cause the apparatus to set the one or more pressure values below the pressure minimum threshold to a constant pressure value.

12. The apparatus of claim 9, further comprising instructions that, when executed by the at least one processor, cause the apparatus to filter the pressure values to smooth the stroke width by weighting an immediately previous filtered value and adjusting a current pressure value to be closer to the previous filtered value so a change in the stroke width is more gradual.

13. The apparatus of claim 9, wherein scaling the pressure value further comprises: subtracting the pressure minimum threshold from a pressure value and dividing by a difference between the maximum pressure value and the pressure minimum threshold to obtain at least one initial remapped pressure value.

14. The apparatus of claim 11, wherein the constant pressure value is below the pressure minimum threshold and the adjusted bottom pressure value.

15. The apparatus of claim 13, wherein scaling the pressure value further comprises: linearly scaling the at least one initial remapped pressure value by multiplying the at least one initial remapped pressure value by the adjusted bottom pressure value+(the maximum pressure value−the adjusted bottom pressure value).

16. A non-transitory computer readable medium storing instructions that, when executed by at least one processor, cause a computer system to perform the steps of:
  receiving, from a pressure-sensitive device, pressure values in response to user interaction relative to the pressure-sensitive device;
  determining one or more pressure values that fall below a pressure minimum threshold indicative of a lift event;
  identifying an adjusted bottom pressure value, the adjusted bottom pressure indicative of a minimum stroke width;
  scaling pressure values that do not fall below the pressure minimum threshold to obtain remapped pressure values over a range between the adjusted bottom pressure value and a maximum pressure value;
  computing a width of a stroke based on the scaled pressure values; and
  rendering, by the pressure-sensitive device a stroke based on the computed width.

17. The non-transitory computer readable medium of claim 16, wherein, the instructions, when executed by the at least one processor, cause the computer system to further perform the step of scaling the pressure values by:
  subtracting the pressure minimum threshold from a pressure value; and
  dividing by a difference between the maximum pressure value and the pressure minimum threshold to obtain at least one initial remapped pressure value.

18. The non-transitory computer readable medium of claim 16, further comprising instructions that, when executed by the at least one processor, cause the computer system to perform the step of filtering the pressure values to smooth the stroke width.

19. The non-transitory computer readable medium of claim 17, wherein, the instructions, when executed by the at least one processor, cause the computer system to further perform the step of scaling the pressure values by linearly scaling the at least one initial remapped pressure value by multiplying the at least one initial remapped pressure value by the adjusted bottom pressure value+(the maximum pressure value−the adjusted bottom pressure value).

20. The non-transitory computer readable medium of claim 18, wherein, the instructions, when executed by the at least one processor, cause the computer system to perform the step of filtering the pressure values by weighting an immediately previous filtered value and adjusting a current pressure value to be closer to the previous filtered value so a change in the stroke width is more gradual.

* * * * *